US012630174B2

(12) United States Patent
    Birsching

(10) Patent No.: US 12,630,174 B2
(45) Date of Patent: *May 19, 2026

(54) SYSTEMS AND METHODS FOR HANDS-ON-WHEEL DETECTION

(71) Applicant: STEERING SOLUTIONS IP HOLDING CORPORATION, Saginaw, MI (US)

(72) Inventor: Joel E. Birsching, Vassar, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 787 days.

This patent is subject to a terminal disclaimer.

(21) Appl. No.: 17/592,707

(22) Filed: Feb. 4, 2022

(65) Prior Publication Data

US 2023/0174088 A1      Jun. 8, 2023

Related U.S. Application Data

(60) Provisional application No. 63/287,485, filed on Dec. 8, 2021.

(51) Int. Cl.
    *B60W 50/12*        (2012.01)
    *B60W 40/09*        (2012.01)
(52) U.S. Cl.
    CPC ............ *B60W 50/12* (2013.01); *B60W 40/09* (2013.01); *B60W 2510/202* (2013.01); *B60W 2540/223* (2020.02); *B60W 2540/229* (2020.02)
(58) Field of Classification Search
    CPC ...... B60W 40/08; B60W 40/09; B60W 50/12; B60W 2040/0881; B60W 2510/202;
    (Continued)

(56) References Cited

U.S. PATENT DOCUMENTS

| | | | |
|---|---|---|---|
| 9,873,453 | B2 | 1/2018 | Shah et al. |
| 10,029,676 | B2 | 7/2018 | Kaufmann et al. |

(Continued)

FOREIGN PATENT DOCUMENTS

| | | |
|---|---|---|
| CN | 105691445 A | 6/2016 |
| CN | 106741133 A | 5/2017 |

(Continued)

OTHER PUBLICATIONS

CN Office Action & Search Report for corresponding CN Patent Application No. 202211569274.3 dated May 23, 2025, 6 pgs, No English Translation Available.

(Continued)

*Primary Examiner* — Peter D Nolan
*Assistant Examiner* — Ce Li Li
(74) *Attorney, Agent, or Firm* — Dickinson Wright PLLC

(57) ABSTRACT

A method hands-on-wheel detection includes receiving a handwheel angle signal from a sensor associated with a handwheel of a vehicle and generating, based on a handwheel angle indicated by the handwheel angle signal, a handwheel speed signal and a handwheel acceleration signal. The method also includes synchronizing the handwheel speed signal and the handwheel acceleration signal by generating a delayed handwheel speed signal and a delayed handwheel acceleration signal. The method also includes generating an operator torque estimation signal based on, at least, the delayed handwheel speed signal and the delayed handwheel acceleration signal. The method also includes determining whether hands of an operator of the vehicle are on the handwheel based on the operator torque estimation signal.

18 Claims, 15 Drawing Sheets

(58) Field of Classification Search
CPC ....... B60W 2540/18; B60W 2540/223; B60W 2540/229; B62D 1/04; B62D 5/00; B62D 5/0463; B62D 5/062; B62D 5/091; B62D 6/008; B62D 15/021; B62D 15/025
See application file for complete search history.

(56)                    References Cited

U.S. PATENT DOCUMENTS

| | | | |
|---|---|---|---|
| 10,414,433 B2 | 9/2019 | Birsching | |
| 10,481,602 B2 | 11/2019 | Chandy | |
| 11,091,148 B2 | 8/2021 | Kaufmann et al. | |
| 2012/0323458 A1* | 12/2012 | Futamura | B60T 8/1755 701/72 |
| 2018/0172528 A1 | 6/2018 | Kim et al. | |
| 2019/0061809 A1* | 2/2019 | Weiefors | B62D 5/062 |
| 2019/0315392 A1* | 10/2019 | Moulaire | B62D 5/0463 |
| 2022/0089218 A1* | 3/2022 | Kodera | B62D 6/002 |
| 2022/0227338 A1* | 7/2022 | Patheja | B60W 10/18 |

FOREIGN PATENT DOCUMENTS

| | | |
|---|---|---|
| CN | 107082072 A | 8/2017 |
| CN | 110072762 A | 7/2019 |
| CN | 110573405 A | 12/2019 |
| CN | 111055846 A | 4/2020 |
| CN | 112793581 A | 5/2021 |
| DE | 102015016217 A1 | 6/2016 |
| DE | 102019130456 A1 | 11/2020 |

OTHER PUBLICATIONS

DE Office Action for corresponding DE Patent Application No. 10 2022 131 404.9 dated Aug. 29, 2025, 4 pgs, No English Translation Available.

* cited by examiner

MOST
MEDIA ORIENTED SYSTEMS TRANSPORT
ETHERNET AVB (AUDIO VIDEO BRIDGING)
ETHERNET TSN (TIME-SENSITIVE NETWORKING)

LIN
LOCAL INTERCONNECT NETWORK
MULTIFUNCTION KEYLESS SYSTEM

CAN
CONTROLLER AREA NETWORK
COLLISION DETECTION SYSTEM 18

FlexRay
BRAKE-BY-WIRE SYSTEM

ETHERNET

300

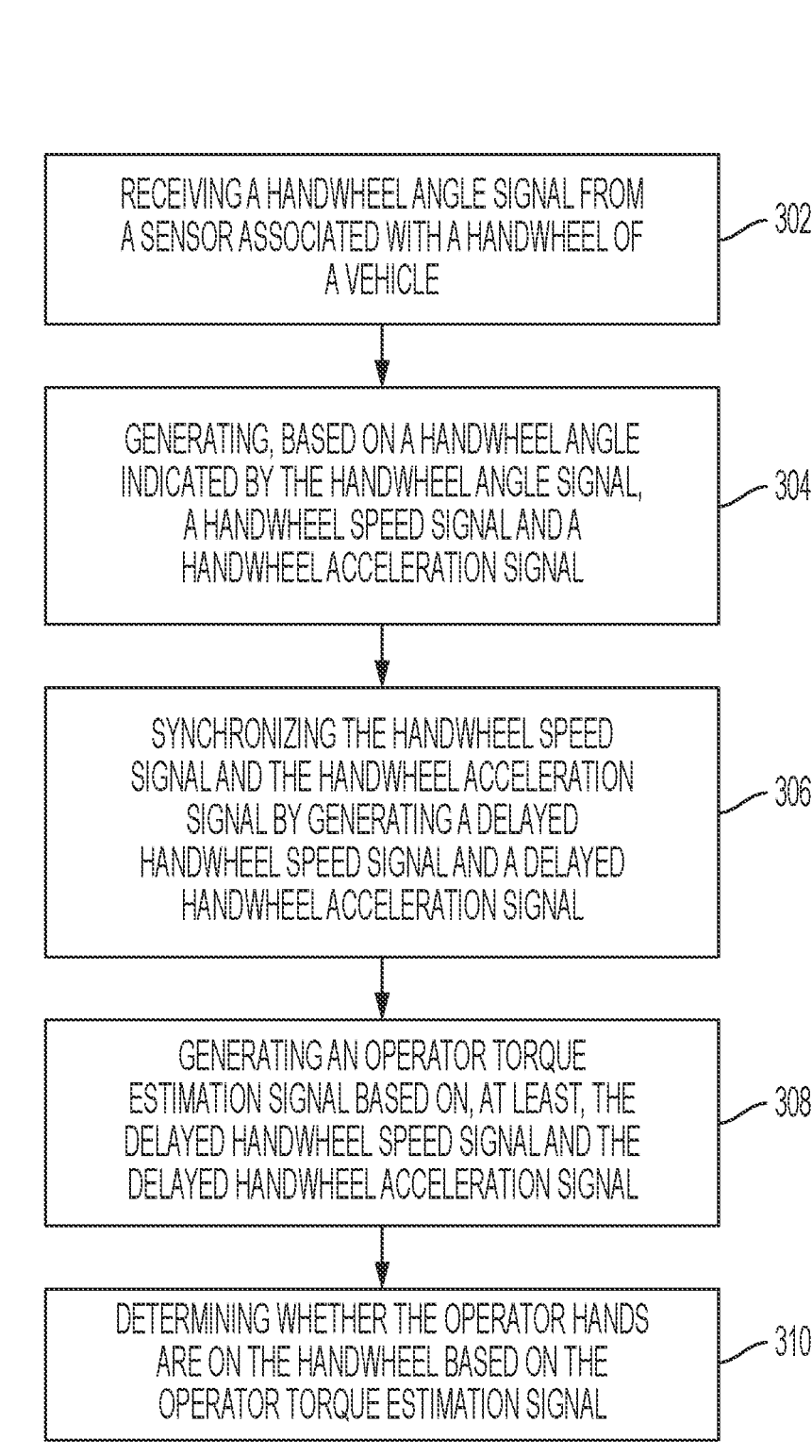

RECEIVING A HANDWHEEL ANGLE SIGNAL FROM
A SENSOR ASSOCIATED WITH A HANDWHEEL OF
A VEHICLE                                          302

GENERATING, BASED ON A HANDWHEEL ANGLE
INDICATED BY THE HANDWHEEL ANGLE SIGNAL,
A HANDWHEEL SPEED SIGNAL AND A
HANDWHEEL ACCELERATION SIGNAL               304

SYNCHRONIZING THE HANDWHEEL SPEED
SIGNAL AND THE HANDWHEEL ACCELERATION
SIGNAL BY GENERATING A DELAYED
HANDWHEEL SPEED SIGNAL AND A DELAYED
HANDWHEEL ACCELERATION SIGNAL               306

GENERATING AN OPERATOR TORQUE
ESTIMATION SIGNAL BASED ON, AT LEAST, THE
DELAYED HANDWHEEL SPEED SIGNAL AND THE
DELAYED HANDWHEEL ACCELERATION SIGNAL       308

DETERMINING WHETHER THE OPERATOR HANDS
ARE ON THE HANDWHEEL BASED ON THE
OPERATOR TORQUE ESTIMATION SIGNAL           310

FIG. 12

SYSTEMS AND METHODS FOR HANDS-ON-WHEEL DETECTION

CROSS-REFERENCES TO RELATED APPLICATIONS

This patent application claims priority to U.S. Provisional Patent Application Ser. No. 63/287,485 filed Dec. 8, 2021, which is incorporated herein by reference in its entirety.

TECHNICAL FIELD

This disclosure relates to steering systems and, in particular to hands-on-wheel detection for a steering system.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY OF THE INVENTION

This disclosure relates generally to steering systems.

An aspect of the disclosed embodiments includes a method for hands-on-wheel detection. The method includes receiving a handwheel angle signal from a sensor associated with a handwheel of a vehicle and generating, based on a handwheel angle indicated by the handwheel angle signal, a handwheel speed signal and a handwheel acceleration signal. The method also includes synchronizing the handwheel speed signal and the handwheel acceleration signal by generating a delayed handwheel speed signal and a delayed handwheel acceleration signal and generating an operator torque estimation signal based on, at least, the delayed handwheel speed signal and the delayed handwheel acceleration signal. The method also includes determining whether hands of an operator of the vehicle are on the handwheel based on the operator torque estimation signal.

Another aspect of the disclosed embodiments includes a system for hands-on-wheel detection. The system includes a processor and a memory. The memory includes instructions that, when executed by the processor, cause the processor to: receive a handwheel angle signal from a sensor associated with a handwheel of a vehicle; generate, based on a handwheel angle indicated by the handwheel angle signal, a handwheel speed signal and a handwheel acceleration signal; synchronize the handwheel speed signal and the handwheel acceleration signal by generating a delayed handwheel speed signal and a delayed handwheel acceleration signal; generate an operator torque estimation signal based on, at least, the delayed handwheel speed signal and the delayed handwheel acceleration signal; and determine whether hands of an operator of the vehicle are on the handwheel based on the operator torque estimation signal.

Another aspect of the disclosed embodiments includes an apparatus for hands-on-wheel detection. The apparatus includes a processor and a memory. The memory includes instructions that, when executed by the processor, cause the processor to: receive a handwheel angle signal from a sensor associated with a handwheel of a vehicle; generate, based on a handwheel angle indicated by the handwheel angle signal, a handwheel speed signal and a handwheel acceleration signal; synchronize the handwheel speed signal and the handwheel acceleration signal by generating a delayed handwheel speed signal and a delayed handwheel acceleration signal; calculate a damping value by determining a product of a handwheel speed value, indicated by the delayed handwheel speed signal, and a damping coefficient scale value; calculate an inertia value by determining a product of a handwheel acceleration value, indicated by the delayed handwheel acceleration signal, and a handwheel inertia scale value; calculate a friction value by determining a product of a friction direction signal and a friction magnitude scale value; generate a delayed valve toque signal by delaying a received valve torque signal; generate an operator torque estimation signal based on the damping value, the inertia value, the friction value, and the delayed received value torque signal; and determine whether hands of an operator of the vehicle are on the handwheel based on the operator torque estimation signal.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 12 is a flow diagram generally illustrating a hands-on-wheel detection method according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Typically, a hydraulic steering systems uses a power steering pump to provide pressurized hydraulic fluid to either a recirculating ball style steering gear or a rack and pinion style steering gear. The level of torque assist (e.g., to an operator of the vehicle) provided in such a steering system is determined by the amount of torque applied by the operator to a steering valve integrated into the steering gear.

Figure 3:
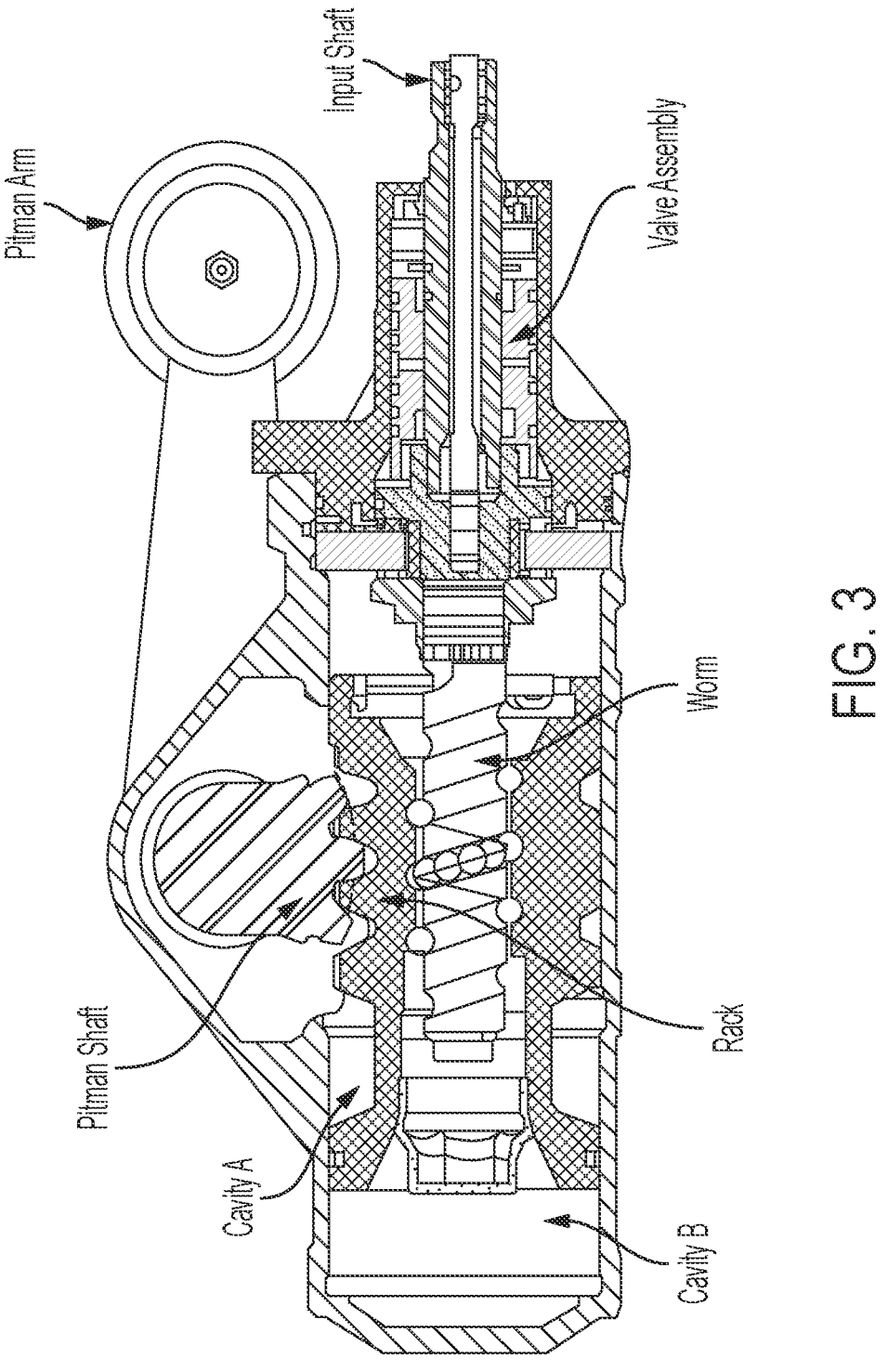
FIG. 3 generally illustrates a recirculating ball steering gear according to the principles of the present disclosure.

A cross section of a recirculating ball steering gear is generally illustrated in FIG. 3. The gear includes an input shaft that is operably connected to the handwheel of the vehicle. When torque is applied to the input shaft, a valve assembly is actuated to provide assist pressure in either cavity A, or cavity B, depending on the direction of the torque, to assist in steering the vehicle. A worm is attached to the bottom of valve assembly that provides a thrust force on a rack. When the valve assembly is rotated in the steering gear, the rack translates in a rack bore along the axis of the worm. The rack has teeth, which mate with teeth on a pitman shaft. When the rack moves axially in the rack bore, the pitman shaft rotates along its axis. A pitman arm is attached to the bottom of the pitman shaft, connecting it to a linkage in the vehicle. When the pitman shaft rotates, the pitman arm swings through an arc. This moves the steering linkage in the vehicle, resulting in angulation of the front wheels in order to steer the vehicle.

Some hydraulic steering systems incorporate a magnetic actuator into the valve assembly. Such a steering system allows advanced algorithms to be implemented on a hydraulic system, such as variable effort, leads and pulls correction, active damping, active return, and the like. This may also provide the opportunity to receive torque commands from external algorithms on the vehicle, which can be included in the output torque.

Figure 4:
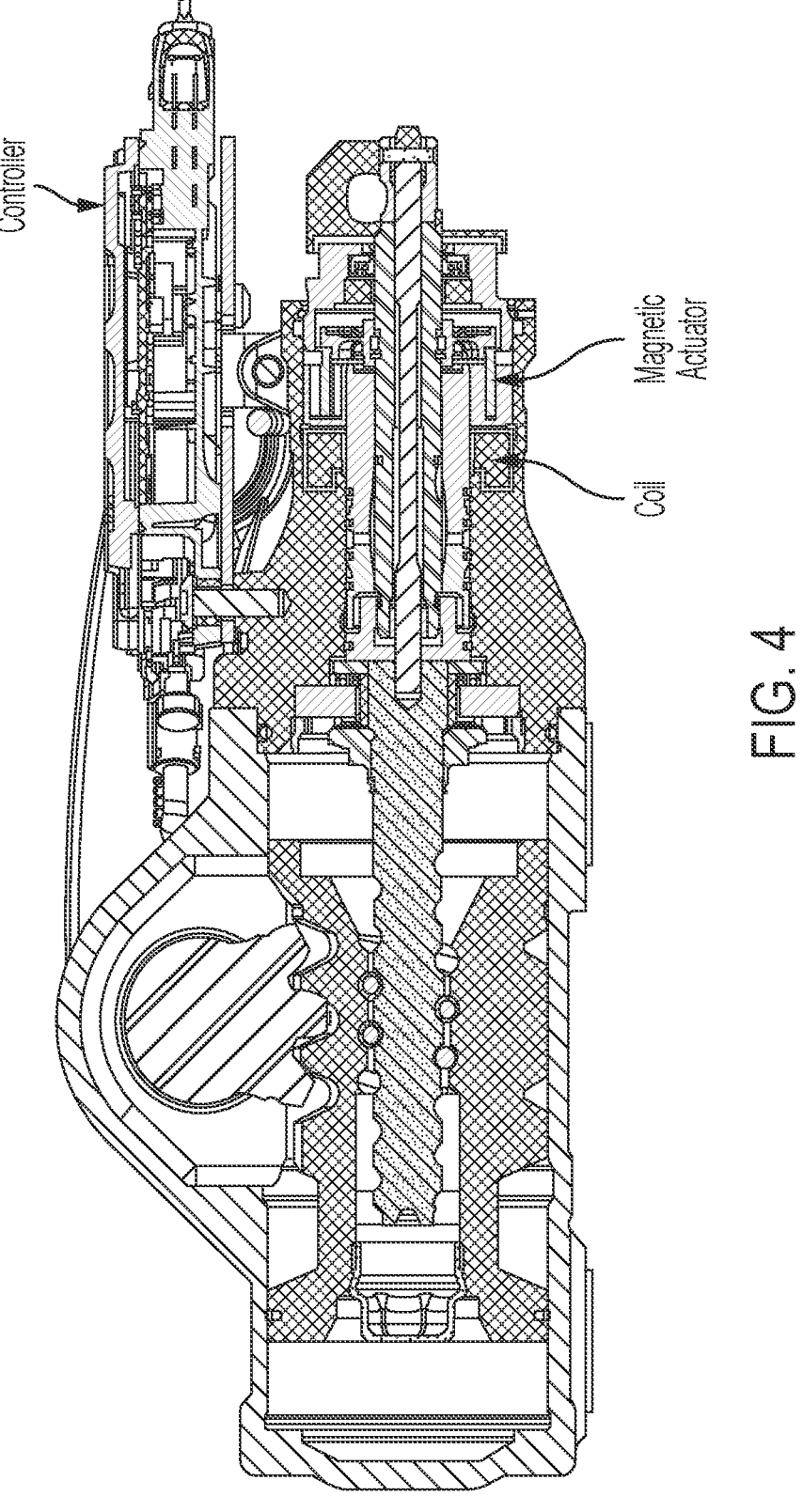
FIG. 4 generally illustrates a hydraulic steering system ball steering gear according to the principles of the present disclosure.

A cross section of a recirculating ball steering gear of such a hydraulic steering system (e.g., including the magnetic actuator) is generally illustrated in FIG. 4. As is generally illustrated, the assist and the connection from the handwheel and the road wheels are functionally the same as a base gear. The gear includes a magnetic actuator incorporated into the valve assembly, to provide additional effort to aid or to resist the operator during certain steering conditions. In these conditions, a controller provides current to a coil that determines the amount of torque provided by the magnetic actuator.

Figure 5A:
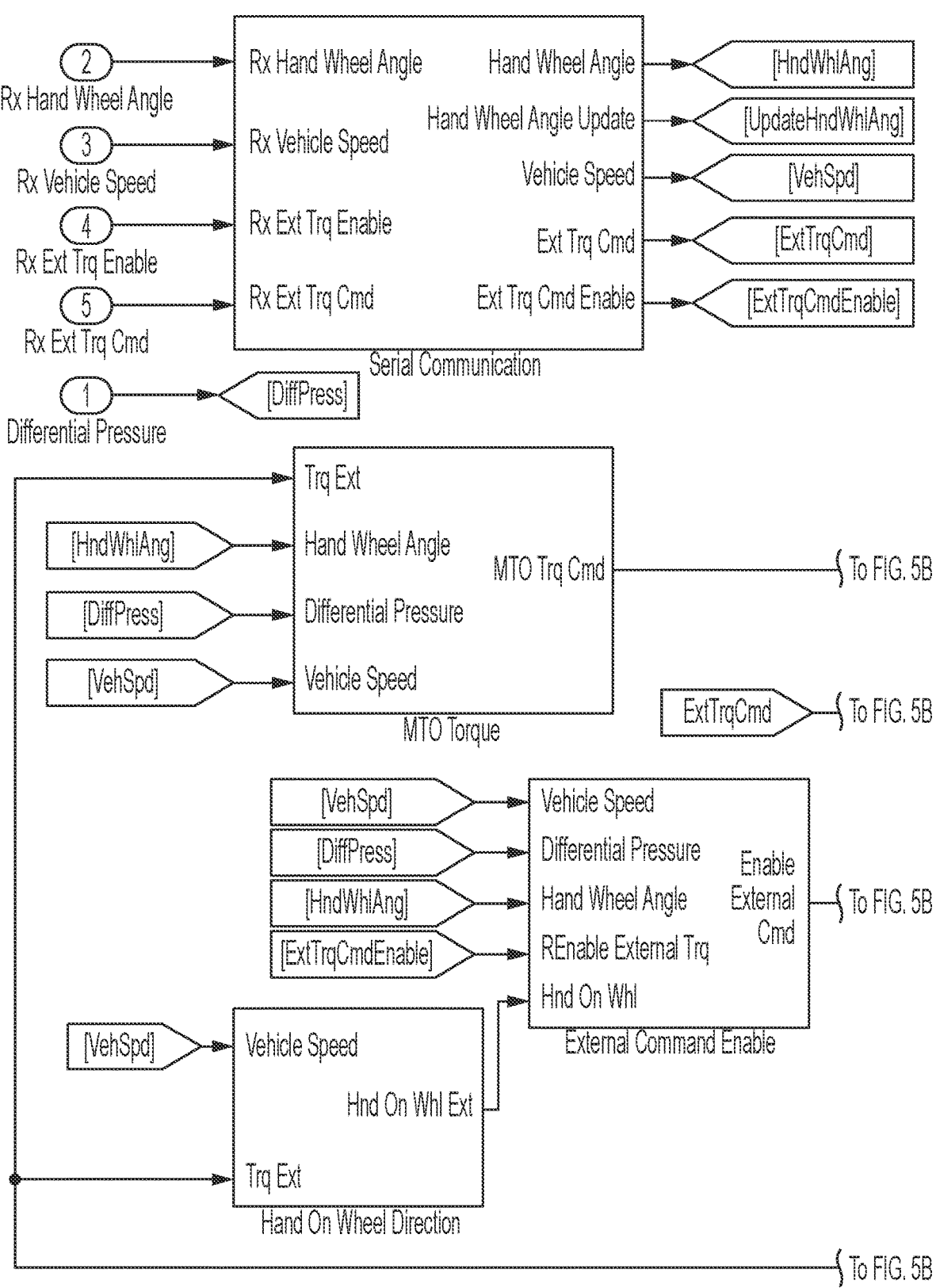
FIGS. 5A-5B generally illustrate a schematic of a hydraulic steering system control system according to the principles of the present disclosure.
Figure 5B:
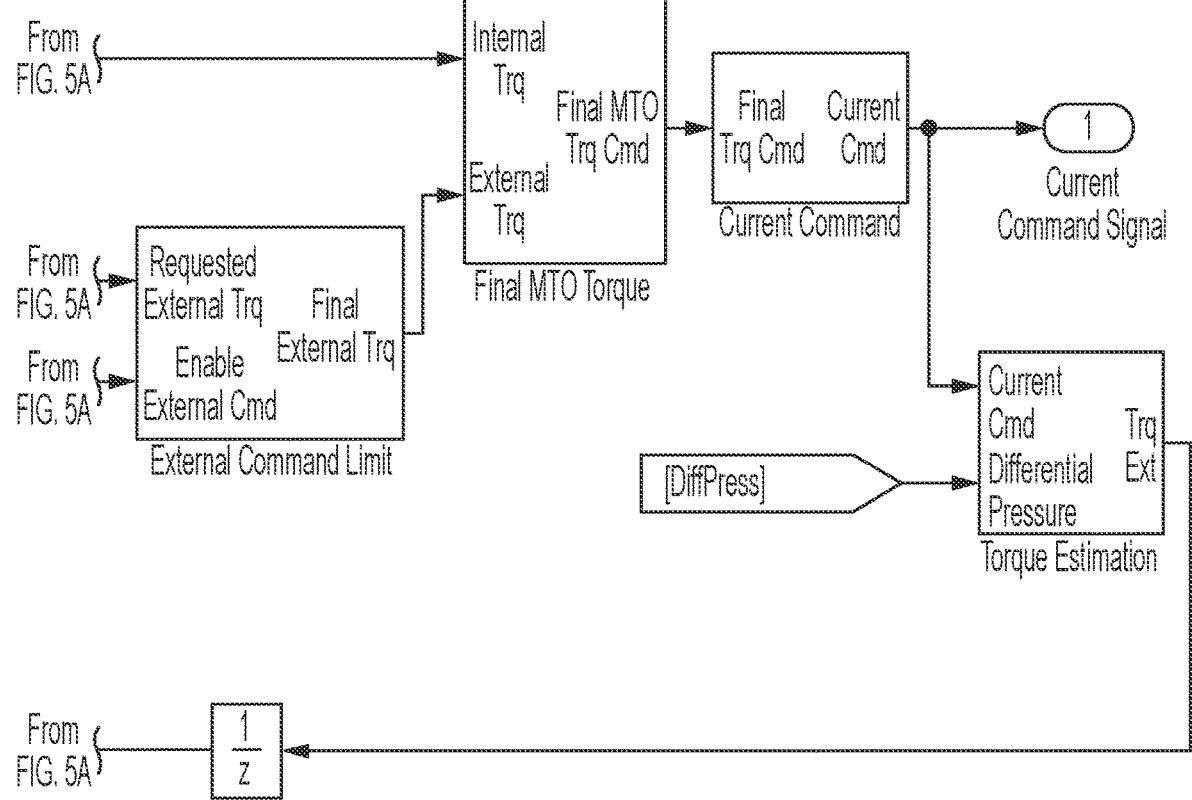

A high-level block diagram of the controls of the hydraulic steering system is generally illustrated in FIGS. 5A-5B. A measurement of the differential pressure across the piston in the steering system, along with various vehicle signals such as vehicle speed, hand wheel speed and hand wheel angle, and an estimation of operator torque are used to generate a desired torque command. An external torque command signal and an external torque enable signal may also be received from the vehicle (e.g., by the controller). The external torque enable signal is evaluated along with signals such as differential pressure, handwheel angle, vehicle speed, and a hands-on-wheel detection signal, to determine if the conditions are acceptable to allow the external torque command.

An external command limit block then determines the amount of the external signal to apply. A final torque block combines the internal torque command and the external torque command to provide a final torque command. This torque command is provided to a current command module that converts the desired torque command into a required current command, which is the applied to the magnetic actuator coil in the steering gear. The current command, along with the measured differential pressure, is used to generate an estimation of operator torque which can be used in the next loop.

Figure 6:
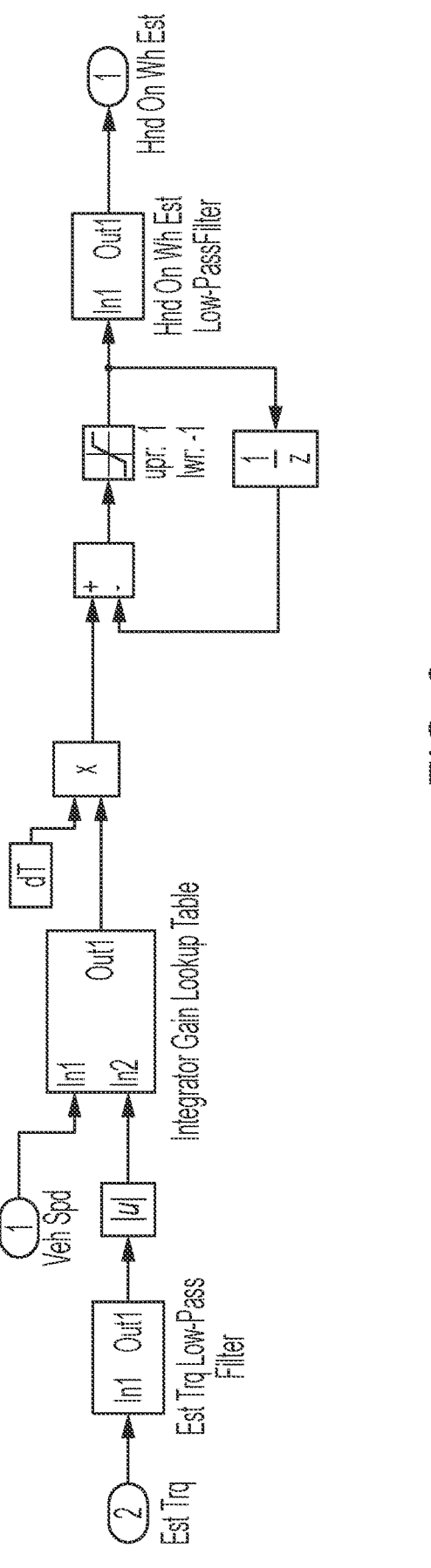
FIG. 6 generally illustrates a schematic of a hands-on-wheel detection system according to the principles of the present disclosure.

The estimated operator torque can be used by a hands-on-wheel detection block, to generate a signal indicating if the hands of operator hands are on the handwheel. An example of a hands-on-wheel detection block is generally illustrated in FIG. 6. The estimated operator torque signal is filtered. The absolute value of the filtered estimated operator torque is used, along with vehicle speed, to select a gain value from a lookup table. This gain value typically has a higher positive value when the torque level is high, and a higher negative value when the torque is near zero. The gain value is multiplied by the periodic rate of the hands-on-wheel detection block and integrated over time. A limit of 1 and −1 are applied to the integrated signal. The limited signal can be filtered before outputting the final hands-on-wheel detection signal.

The estimated operator torque determined in this application, is the torque applied across the hydraulic valve assembly. While this provides a reasonable estimation of operator torque during slow hand wheel velocities and steady state conditions, it does not account for inertia, damping, and friction effects of the handwheel and column. This can lead to errors during rapid steering maneuvers.

Accordingly, systems and methods, such as those described herein, configured to provide improved hands-on-wheel detection, may be desirable. In some embodiments, the systems and methods described herein may be configured to use a handwheel angle signal in addition to the estimated operator torque signal, to improve performance during rapid motion of the handwheel.

Figure 7A:
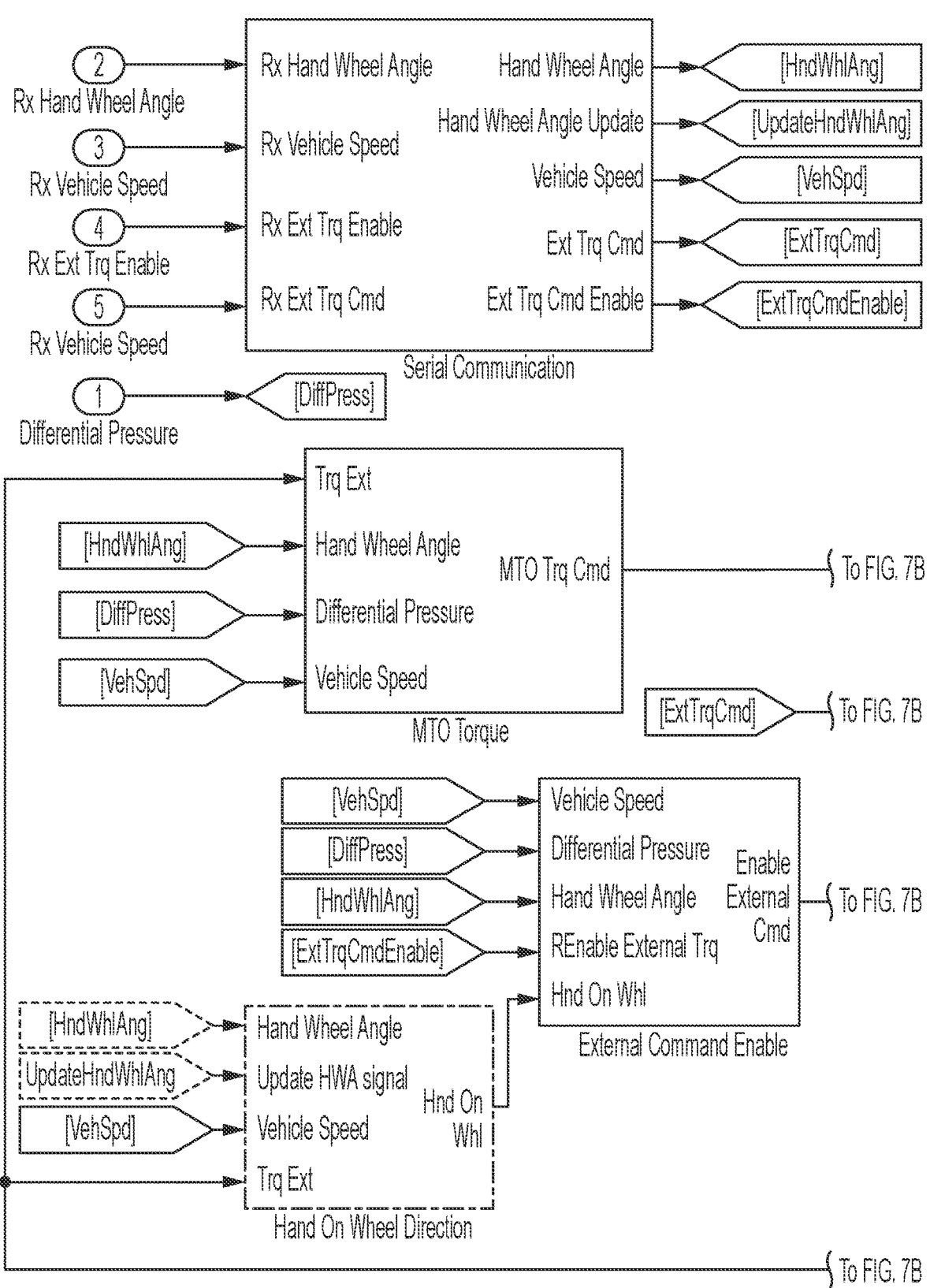
FIGS. 7A-7B generally illustrate a schematic of an alternative hands-on-wheel detection system according to the principles of the present disclosure.
Figure 7B:
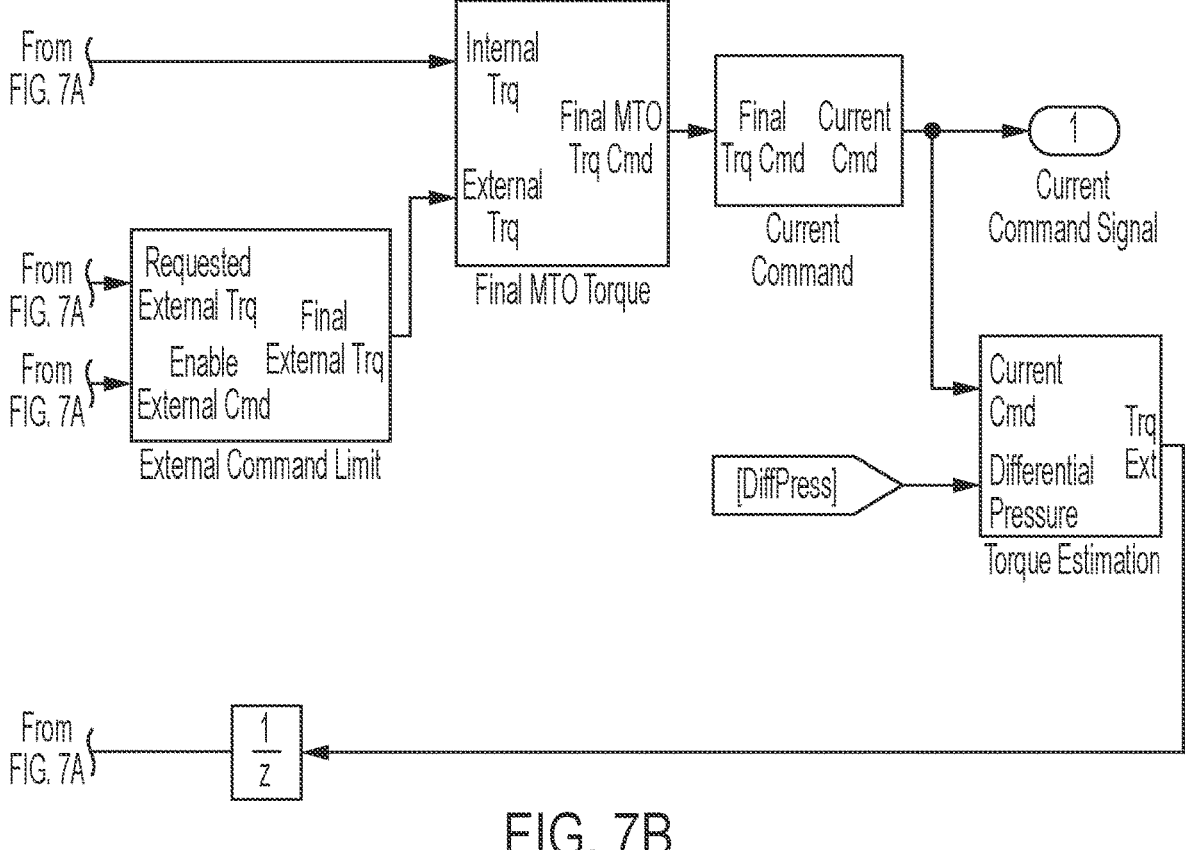

FIGS. 7A-7B generally illustrate a high-level block diagram of the controls for a steering system that includes a hands-on-wheel detection block. The systems and methods described herein may be configured to use two input signals: a handwheel angle signal, and an update handwheel angle signal. The systems and methods described herein may be configured to receive the handwheel angle signal from a serial communications device or system of the vehicle. This signal may not be updated at the same periodic rate as the hands-on-wheel detection block. The systems and methods described herein may be configured to set the update handwheel angle signal to true when the handwheel angle signal is updated on the serial communication bus.

The systems and methods described herein may be configured to set the handwheel angle signal to false when the handwheel angle signal is retained from a previous loop. The systems and methods described herein may be configured to use the update handwheel angle signal to modify the value of handwheel angle signal at the hands-on-wheel detection periodic rate (e.g., even though the handwheel angle signal from serial communications has not changed).

Figure 8:
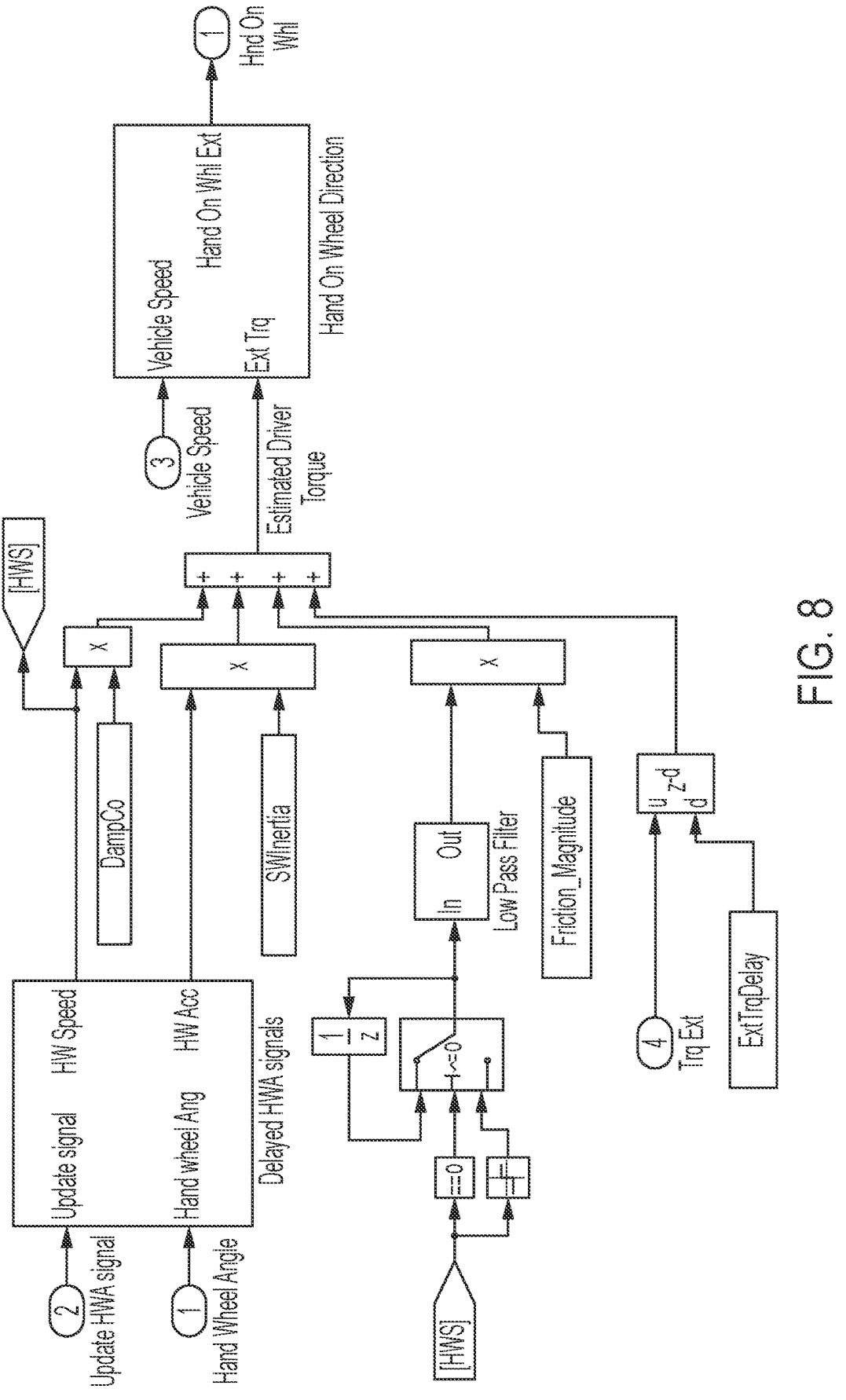
FIG. 8 generally illustrates a schematic of an alternative hands-on-wheel detection system according to the principles of the present disclosure.

FIG. 8 generally illustrates the hands-on-wheel detection block. The systems and methods described herein may be configured to use an estimated torque from a torque estimation block (e.g., of FIGS. 7A-7B), and elements to reflect the dynamic effects of the handwheel and column as a function of the handwheel speed and handwheel acceleration.

In some embodiments, the systems and methods described herein may be configured to compute a handwheel speed (HWS) and a handwheel acceleration (Acc) using the handwheel angle (HWA). For example, the systems and methods described herein may be configured to compute the HWS at Time step 1 from the HWA at Time step 0 and Time step 2, which may be defined according to:

$$HWS_1=(HWA_0-HWA_2)/(2*dT), \text{ where } dT=\text{time difference between Time steps}$$

The systems and methods described herein may be configured to use memory blocks associated with the controller to store values of HWS at additional time steps (e.g., such as $HWS_2$, $HWS_3$, $HWS_4$, or other suitable time step). The systems and methods described herein may be configured to compute the Acc at Time step 2 using the HWS at Time step 1 and Time step 3, which may be defined according to:

$$Acc_2=(HWS_1-HWS_3)/(2*dT), \text{ where } dT=\text{time difference between Time steps}$$

The systems and methods described herein may be configured to use the memory blocks to store values of Acc at additional time steps (e.g., such as $Acc_3$, $Acc_4$, or other suitable time step).

From this, as is generally illustrated, the earliest time step that HWS can be calculated is delayed one time step from the current time step, and the earliest time step that Acc can be calculated is delayed two time steps from the current time step. In order to minimize the error in the estimated operator torque during rapid steering maneuvers, the systems and methods described herein may be configured to synchronize the handwheel related signals so that the HWS and Acc values calculated, refer to the same time step. For example, delayed $HWS=HWS_2$ and delayed $Acc=Acc_2$.

In some embodiments, the systems and methods described herein may be configured to, in order to estimate the value of HWS and Acc when the hands-on-wheel detection block is computed but HWA has not been refreshed, apply an additional time step delay, for a total of three time step delays, and the values for HWS and Acc can be incremented linearly between $HWS_2$ and $HWS_3$, and $Acc_2$ and $Acc_3$. For example, if the handwheel angle is updated every fifth time the systems and methods described herein compute the hands-on-wheel detection block, the systems and methods described herein may be configured to calculate an HWS increment that is one fifth the difference between $HWS_2$ and $HWS_3$, which may be defined according to:

$$HWS_{Inc}=(HWS_2-HWS_3)/5$$

The systems and methods described herein may be configured to add $HWS_{Inc}$ to the previous value of delayed HWS every execution of the hands-on-wheel detection block until the HWA signal is updated.

Similarly, the systems and methods described herein may be configured to calculate an Acc increment that is one fifth the difference between $Acc_2$ and $Acc_3$, which may be defined according to:

$$Acc_{Inc}=(Acc_2-Acc_3)/5$$

The systems and methods described herein may be configured to add $Acc_{Inc}$ to the previous value of delayed Acc every execution of the hands-on-wheel detection block until the HWA signal is updated.

Figure 9A:
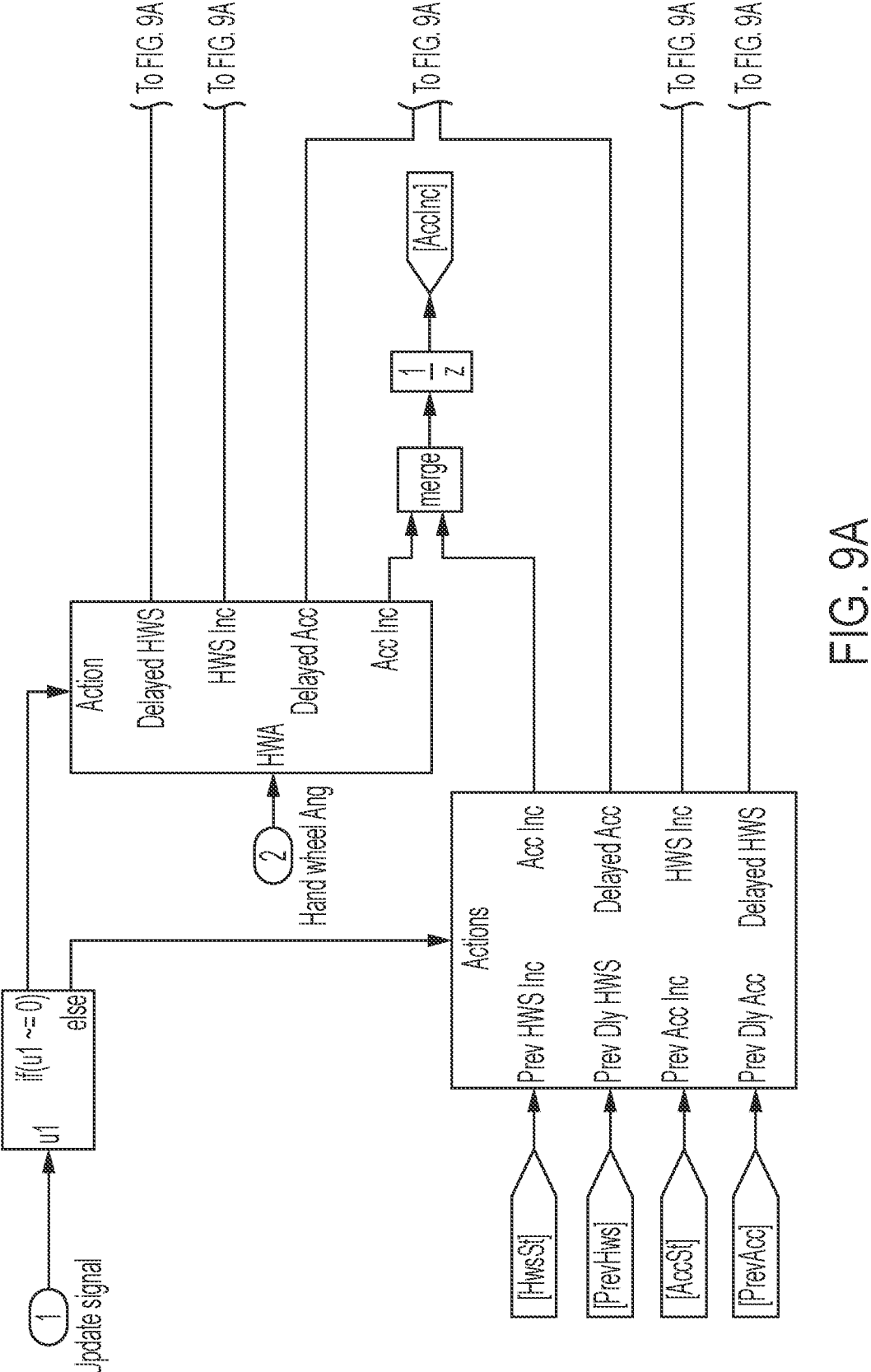
FIGS. 9A-9B generally illustrate a schematic of an alternative hands-on-wheel detection system according to the principles of the present disclosure.
Figure 9B:
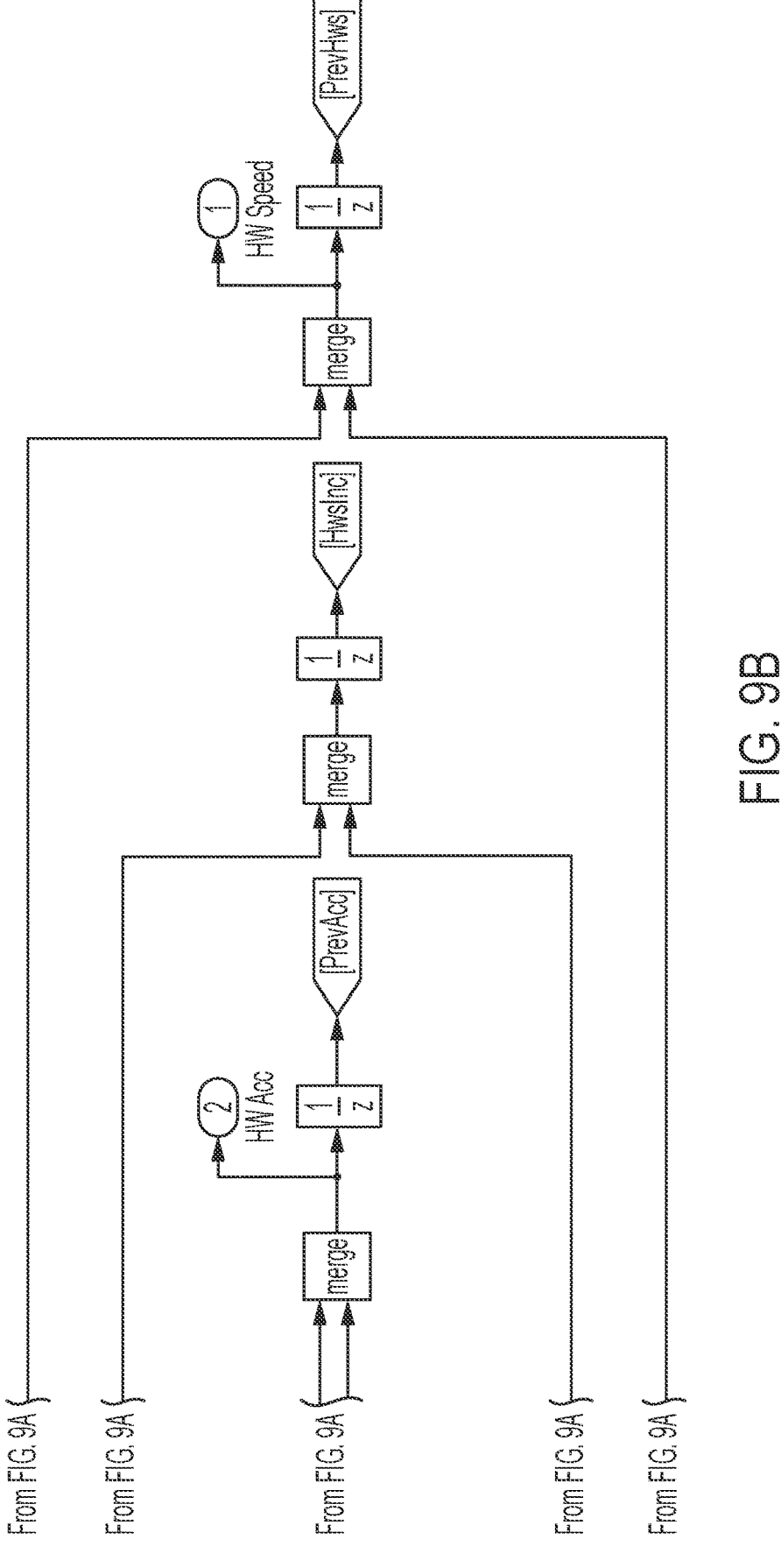
Figure 10:
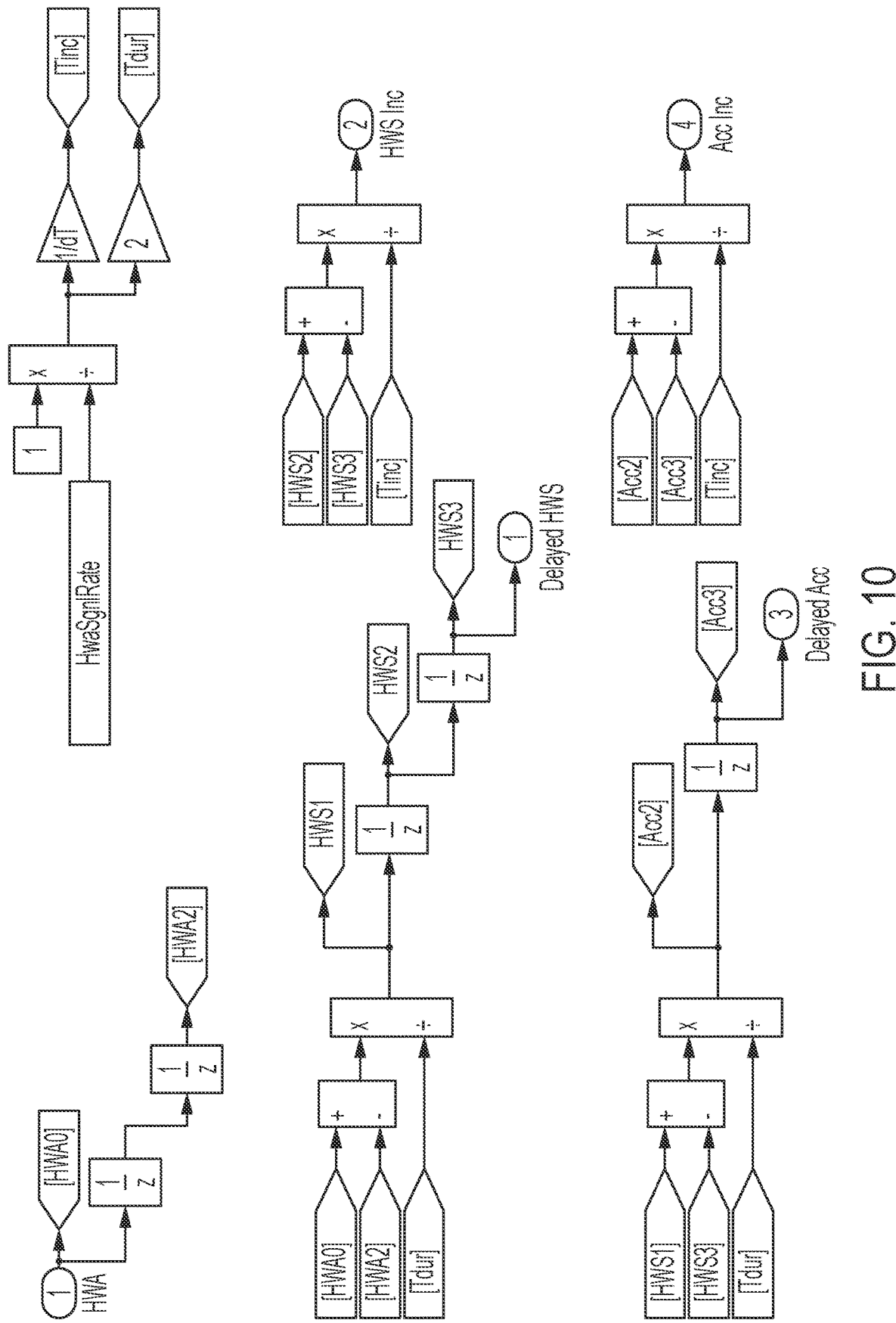
FIG. 10 generally illustrates a schematic of an alternative hands-on-wheel detection system according to the principles of the present disclosure.

FIGS. 9A-9B generally illustrate the delayed handwheel angle signals block that implements the delayed HWA related signals, as described. When the update signal value is true, the systems and methods described herein may be configured to compute the delayed HWS and delayed Acc signals along with the $HWS_{Inc}$ and $Acc_{Inc}$ signals, as is generally illustrated in FIG. 10.

Figure 11:
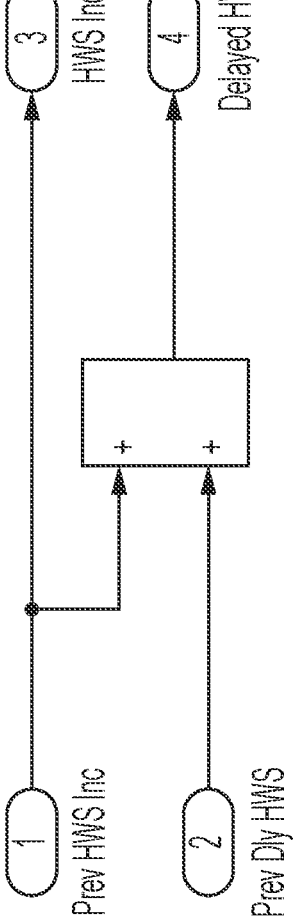
FIG. 11 generally illustrates a schematic of an alternative hands-on-wheel detection system according to the principles of the present disclosure.
Figure 11:
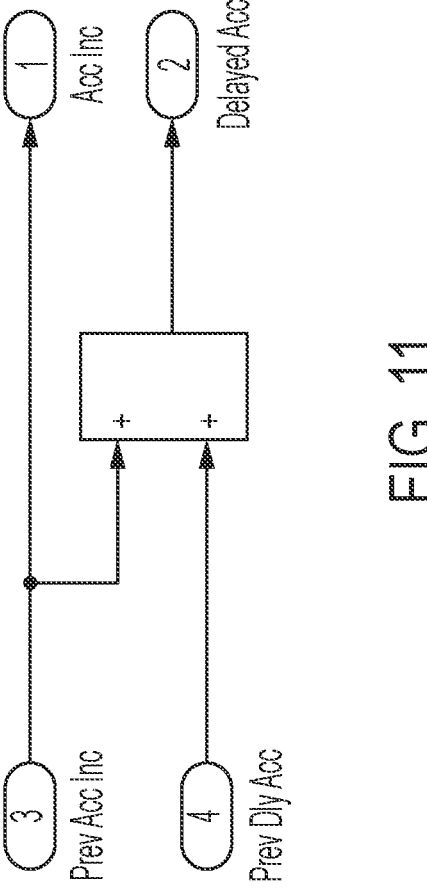

When the update signal value is false, the systems and methods described herein may be configured to increment the delayed HWS and delayed Acc signals using the values of $HWS_{Inc}$ and $Acc_{Inc}$ signals (e.g., which are generally illustrated in FIG. 11).

Referring again to FIG. 8, the systems and methods described herein may be configured to calculate an operator torque estimation signal and pass the signal to the hands-on-wheel detection integration routine. The systems and methods described herein may be configured to calculate the operator torque estimation signal by determining the sum of four signals representing a damping component, an inertia component, a friction component, and a valve torque component. The damping component is computed by multiplying the delayed handwheel speed signal by a damping coefficient scale value.

The inertia component is computed by multiplying the delayed handwheel acceleration signal by a handwheel inertia scale value. The friction component is computed by multiplying a friction direction signal by a friction magnitude scale value. The initial friction direction signal is determined by the sign of the delayed handwheel speed signal. If the delayed handwheel speed signal is positive, the initial direction signal is 1. If the delayed handwheel speed signal is negative, then the initial direction signal is −1. If the delayed handwheel speed signal is zero, then the initial direction signal is the same as the value from the previous loop.

The systems and methods described herein may be configured to apply a low pass filter to the initial friction direction signal to obtain a final friction direction signal that transitions from 1 to −1 or from −1 to 1 at a slower rate. The valve torque component signal is Trq Est signal from the torque estimation block in FIGS. 7A-7B, with a delay applied. The delay is calibratable to allow the Trq Est signal to be synchronized with the delayed handwheel angle signals (e.g., which may minimize, reduce, or eliminate errors during rapid steering maneuvers).

It should be noted that the damping coefficient, handwheel inertia, and friction magnitude scale values may be implemented in various forms. They may be constant values in code, constant calibration values, or values determined from calibratable lookup tables dependent on other signals such as vehicle speed.

In some embodiments, the systems and methods described herein may be configured provide a means of computing a hands-on-wheel detection signal. The systems and methods described herein may be configured to use a handwheel angle signal received from the vehicle. The systems and methods described herein may be configured to compute a handwheel speed and a handwheel acceleration signals from the handwheel angle signal. The systems and methods described herein may be configured to delay the handwheel speed and the handwheel acceleration signals, in order to synchronize the handwheel speed and the handwheel acceleration signals.

The systems and methods described herein may be configured to compute the handwheel speed and the handwheel acceleration signals for each execution of the hands-on-wheel detection block (e.g., even if the handwheel angle signal is not updated). The systems and methods described herein may be configured to modify the signals linearly for the time steps in which the handwheel angle signal is not updated. The systems and methods described herein may be configured to estimate the operator torque using damping, inertia, and friction. The systems and methods described herein may be configured to use a delayed estimation of valve torque in order to synchronize the torque estimation with the delayed handwheel generated signals. The systems and methods described herein may be configured to use a filter to reduce the rate of change in applied friction direction.

In some embodiments, the systems and methods described herein may be configured to receive a handwheel angle signal from a sensor associated with a handwheel of a vehicle. The handwheel is associated with an EPS steering system, an SbW steering system, a hydraulic steering system (e.g., including a magnetic actuator incorporated into a valve assembly of the hydraulic steering system), or other suitably steering system of the vehicle.

The systems and methods described herein may be configured to generate, based on a handwheel angle indicated by the handwheel angle signal, a handwheel speed signal and a handwheel acceleration signal. The systems and methods described herein may be configured to synchronize the handwheel speed signal and the handwheel acceleration signal by generating a delayed handwheel speed signal and a delayed handwheel acceleration signal. The systems and methods described herein may be configured to generate an operator torque estimation signal based on, at least, the delayed handwheel speed signal and the delayed handwheel acceleration signal. For example, the systems and methods described herein may be configured to calculate a damping value by determining a product of a handwheel speed value, indicated by the delayed handwheel speed signal, and a damping coefficient scale value.

The systems and methods described herein may be configured to calculate an inertia value by determining a product of a handwheel acceleration value, indicated by the delayed handwheel acceleration signal, and a handwheel inertia scale value. The systems and methods described herein may be configured to calculate a friction value by determining a product of a friction direction signal and a friction magnitude scale value. The systems and methods described herein may be configured to generate a delayed valve toque signal by delaying a received valve torque signal. The systems and methods described herein may be configured to generate the operator torque estimation signal based on the damping value, the inertia value, the friction value, and the delayed value torque signal. The systems and methods described herein may be configured to determine whether hands of an operator of the vehicle are on the handwheel based on the operator torque estimation signal.

Figure 1:
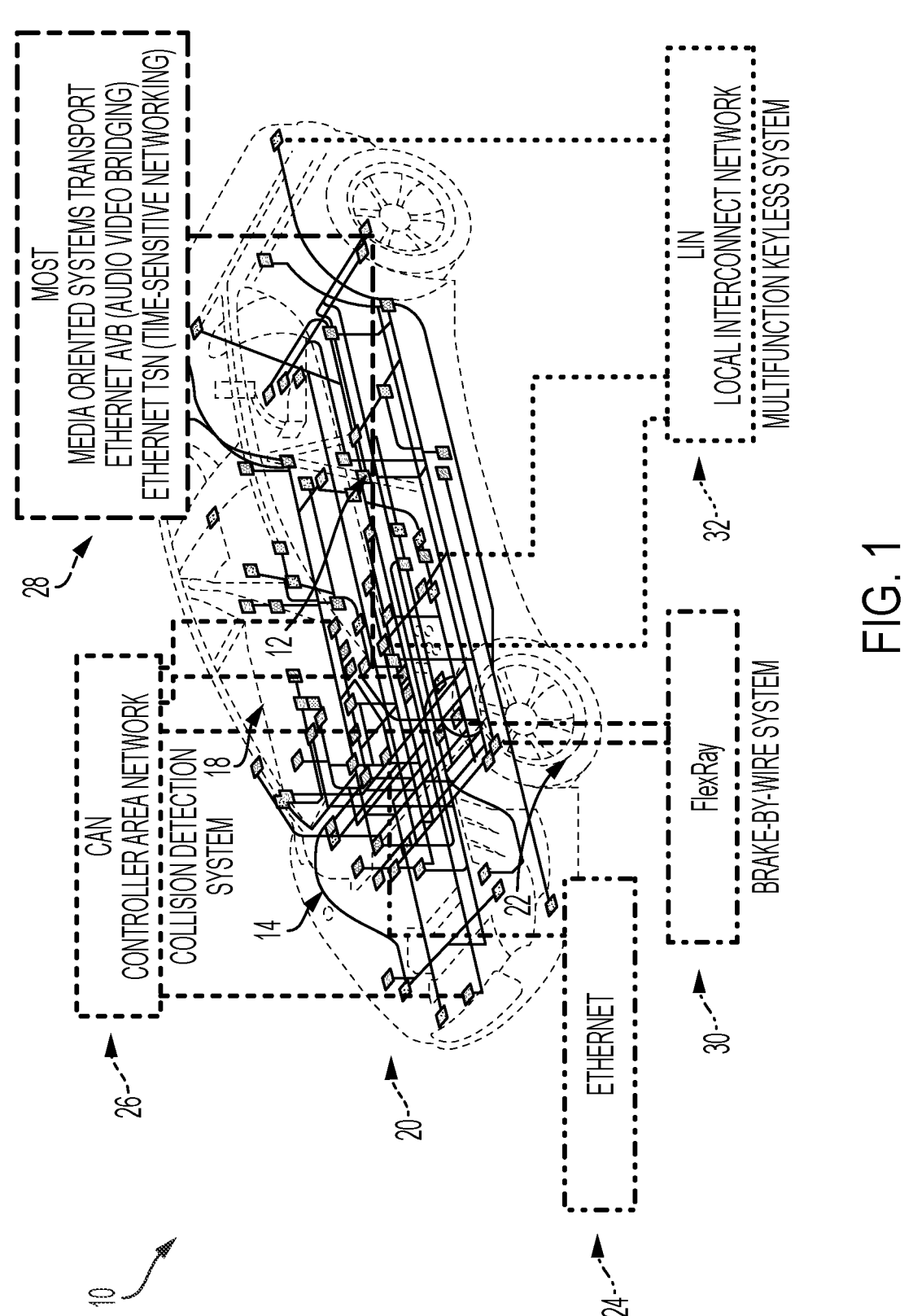
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be movably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by a operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
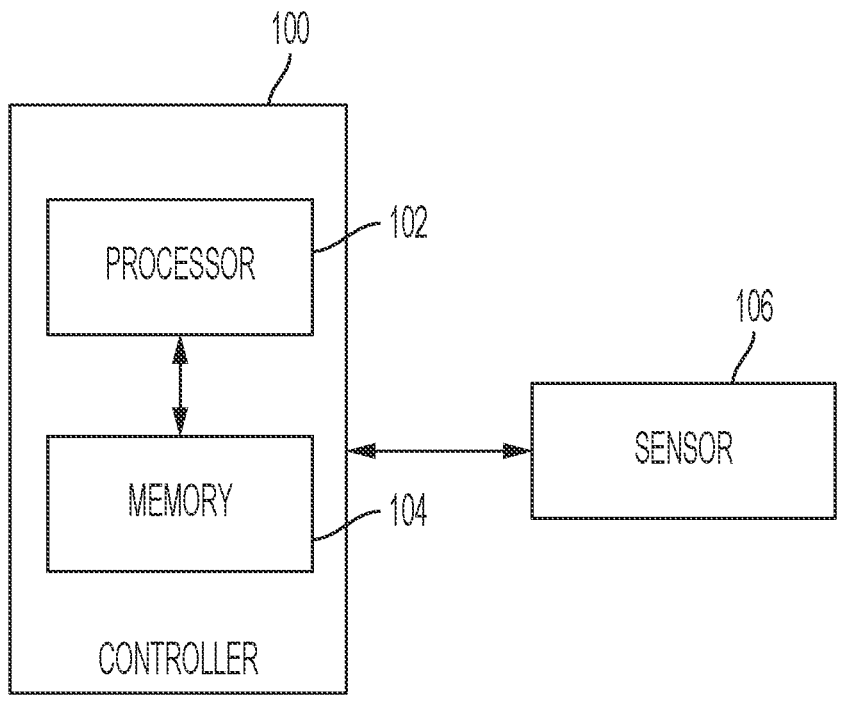
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, controller 100 may be configured to provide hands-on-wheel detection. For example, the controller 100 may receive a handwheel angle signal from and/or associated with one or more sensors 106 (e.g., such as a handwheel position sensor 106 or other suitable sensor 106 or other suitable sensor) associated with the handwheel and/or column of the vehicle 10. The controller 100 may generate, based on a handwheel angle indicated by the handwheel angle signal, a handwheel speed signal and a handwheel acceleration signal.

The controller 100 may synchronize the handwheel speed signal and the handwheel acceleration signal by generating a delayed handwheel speed signal and a delayed handwheel acceleration signal. The controller 100 may generate an operator torque estimation signal based on, at least, the delayed handwheel speed signal and the delayed handwheel acceleration signal. For example, the controller 100 may calculate a damping value by determining a product of a handwheel speed value, indicated by the delayed handwheel speed signal, and a damping coefficient scale value.

The controller 100 may calculate an inertia value by determining a product of a handwheel acceleration value, indicated by the delayed handwheel acceleration signal, and a handwheel inertia scale value. The controller 100 may calculate a friction value by determining a product of a friction direction signal and a friction magnitude scale value. The controller 100 may generate a delayed valve toque signal by delaying a received valve torque signal.

The controller 100 may generate the operator torque estimation signal based on the damping value, the inertia value, the friction value, and the delayed value torque signal. The controller 100 may determine whether hands of an operator of the vehicle are on the handwheel based on the operator torque estimation signal.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

FIG. 12 is a flow diagram generally illustrating a hands-on-wheel detection method 300 according to the principles of the present disclosure. At 302, the method 300 receives a handwheel angle signal from a sensor associated with a handwheel of a vehicle. For example, the controller 100 may receive the handwheel angle signal from the sensor 106 associated with the handwheel of the vehicle 10.

At 304, the method 300 generates, based on a handwheel angle indicated by the handwheel angle signal, a handwheel speed signal and a handwheel acceleration signal. For example, the controller 100 may generate, based on the handwheel angle indicated by the handwheel angle signal, the handwheel speed signal and the handwheel acceleration signal.

At 306, the method 300 synchronizes the handwheel speed signal and the handwheel acceleration signal by generating a delayed handwheel speed signal and a delayed handwheel acceleration signal. For example, the controller 100 may synchronizes the handwheel speed signal and the handwheel acceleration signal by generating the delayed handwheel speed signal and the delayed handwheel acceleration signal.

At 308, the method 300 generates an operator torque estimation signal based on, at least, the delayed handwheel speed signal and the delayed handwheel acceleration signal. For example, the controller 100 may generate the operator torque estimation signal based on, at least, the delayed handwheel speed signal and the delayed handwheel acceleration signal.

At 310, the method 300 determines whether hands of an operator of the vehicle are on the handwheel based on the operator torque estimation signal. For example, the controller 100 may determine whether hands of an operator of the vehicle are on the handwheel based on the operator torque estimation signal.

In some embodiments, a method hands-on-wheel detection includes receiving a handwheel angle signal from a sensor associated with a handwheel of a vehicle and generating, based on a handwheel angle indicated by the handwheel angle signal, a handwheel speed signal and a handwheel acceleration signal. The method also includes synchronizing the handwheel speed signal and the handwheel acceleration signal by generating a delayed handwheel speed signal and a delayed handwheel acceleration signal. The method also includes generating an operator torque estimation signal based on, at least, the delayed handwheel speed signal and the delayed handwheel acceleration signal. The method also includes determining whether hands of an operator of the vehicle are on the handwheel based on the operator torque estimation signal.

In some embodiments, the handwheel is associated with an electric power steering system of the vehicle. In some embodiments, the handwheel is associated with a hydraulic steering system of the vehicle. In some embodiments, the hydraulic steering system includes a magnetic actuator incorporated into a valve assembly of the hydraulic steering system. In some embodiments, generating the operator torque estimation signal based on, at least, the delayed handwheel speed signal and the delayed handwheel acceleration signal includes: calculating a damping value by determining a product of a handwheel speed value, indicated by the delayed handwheel speed signal, and a damping coefficient scale value; calculating an inertia value by determining a product of a handwheel acceleration value, indicated by the delayed handwheel acceleration signal, and a handwheel inertia scale value; calculating a friction value by determining a product of a friction direction signal and a friction magnitude scale value; generating a delayed valve toque signal by delaying a received valve torque signal; and generating the operator torque estimation signal based on the damping value, the inertia value, the friction value, and the delayed value torque signal.

In some embodiments, a method for hands-on-wheel detection includes receiving a handwheel angle signal from a sensor associated with a handwheel of a vehicle and generating, based on a handwheel angle indicated by the handwheel angle signal, a handwheel speed signal and a handwheel acceleration signal. The method also includes synchronizing the handwheel speed signal and the handwheel acceleration signal by generating a delayed handwheel speed signal and a delayed handwheel acceleration signal and generating an operator torque estimation signal based on, at least, the delayed handwheel speed signal and the delayed handwheel acceleration signal. The method also includes determining whether hands of an operator of the vehicle are on the handwheel based on the operator torque estimation signal.

In some embodiments, the handwheel is associated with an electric power steering system of the vehicle. In some embodiments, the handwheel is associated with a hydraulic steering system of the vehicle. In some embodiments, the hydraulic steering system includes a magnetic actuator incorporated into a valve assembly of the hydraulic steering system. In some embodiments, the method also includes: calculating a damping value by determining a product of a handwheel speed value, indicated by the delayed handwheel speed signal, and a damping coefficient scale value; and calculating an inertia value by determining a product of a handwheel acceleration value, indicated by the delayed handwheel acceleration signal, and a handwheel inertia scale value. In some embodiments, the method also includes: calculating a friction value by determining a product of a friction direction signal and a friction magnitude scale value; and generating a delayed valve toque signal by delaying a received valve torque signal. In some embodiments, generating the operator torque estimation signal based on, at least, the delayed handwheel speed signal and the delayed handwheel acceleration signal includes generating the operator torque estimation signal based on the damping value, the inertia value, the friction value, and the delayed received value torque signal. In some embodiments, the sensor associated with the handwheel of the vehicle includes a handwheel position sensor.

In some embodiments, a system for hands-on-wheel detection includes a processor and a memory. The memory includes instructions that, when executed by the processor, cause the processor to: receive a handwheel angle signal from a sensor associated with a handwheel of a vehicle; generate, based on a handwheel angle indicated by the handwheel angle signal, a handwheel speed signal and a handwheel acceleration signal; synchronize the handwheel speed signal and the handwheel acceleration signal by generating a delayed handwheel speed signal and a delayed handwheel acceleration signal; generate an operator torque estimation signal based on, at least, the delayed handwheel speed signal and the delayed handwheel acceleration signal; and determine whether hands of an operator of the vehicle are on the handwheel based on the operator torque estimation signal.

In some embodiments, the handwheel is associated with an electric power steering system of the vehicle. In some embodiments, the handwheel is associated with a hydraulic steering system of the vehicle. In some embodiments, the hydraulic steering system includes a magnetic actuator incorporated into a valve assembly of the hydraulic steering system. In some embodiments, the instructions further cause the processor to: calculate a damping value by determining a product of a handwheel speed value, indicated by the delayed handwheel speed signal, and a damping coefficient scale value; and calculate an inertia value by determining a product of a handwheel acceleration value, indicated by the delayed handwheel acceleration signal, and a handwheel inertia scale value. In some embodiments, the instructions further cause the processor to: calculate a friction value by determining a product of a friction direction signal and a friction magnitude scale value; and generate a delayed valve toque signal by delaying a received valve torque signal. In some embodiments, the instructions further cause the processor to generate the operator torque estimation signal based on, at least, the delayed handwheel speed signal and the delayed handwheel acceleration signal by generating the operator torque estimation signal based on the damping value, the inertia value, the friction value, and the delayed received value torque signal. In some embodiments, the sensor associated with the handwheel of the vehicle includes a handwheel position sensor.

In some embodiments, an apparatus for hands-on-wheel detection includes a processor and a memory. The memory includes instructions that, when executed by the processor, cause the processor to: receive a handwheel angle signal from a sensor associated with a handwheel of a vehicle; generate, based on a handwheel angle indicated by the handwheel angle signal, a handwheel speed signal and a handwheel acceleration signal; synchronize the handwheel speed signal and the handwheel acceleration signal by generating a delayed handwheel speed signal and a delayed handwheel acceleration signal; calculate a damping value by determining a product of a handwheel speed value, indicated by the delayed handwheel speed signal, and a damping coefficient scale value; calculate an inertia value by determining a product of a handwheel acceleration value, indicated by the delayed handwheel acceleration signal, and a handwheel inertia scale value; calculate a friction value by determining a product of a friction direction signal and a friction magnitude scale value; generate a delayed valve toque signal by delaying a received valve torque signal; generate an operator torque estimation signal based on the damping value, the inertia value, the friction value, and the delayed received value torque signal; and determine whether hands of an operator of the vehicle are on the handwheel based on the operator torque estimation signal.

In some embodiments, the handwheel is associated with an electric power steering system of the vehicle. In some embodiments, the handwheel is associated with a hydraulic steering system of the vehicle. In some embodiments, the hydraulic steering system includes a magnetic actuator incorporated into a valve assembly of the hydraulic steering system.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an"

as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for hands-on-wheel detection, the method comprising:

receiving, via a serial communication bus, a handwheel angle signal from a sensor associated with a handwheel of a vehicle;

setting, via the serial communication bus, an update handwheel angle signal indicator to true;

generating, based on a handwheel angle indicated by the handwheel angle signal and based on determining using the serial communication bus that the update handwheel angle signal indicator is set to true, a handwheel speed signal and a handwheel acceleration signal;

synchronizing the handwheel speed signal and the handwheel acceleration signal by generating a delayed handwheel speed signal and a delayed handwheel acceleration signal;

generating a friction value by passing a product of a friction direction signal and a friction magnitude scale value through a low pass filter;

calculating a damping value by determining a product of a handwheel speed value, indicated by the delayed handwheel speed signal, and a damping coefficient scale value; and calculating an inertia value by determining a product of a handwheel acceleration value, indicated by the delayed handwheel acceleration signal, and a handwheel inertia scale value;

generating an operator torque estimation signal based on, at least, the delayed handwheel speed signal, the delayed handwheel acceleration signal, the friction value, the damping value, and the inertia value; and determining whether hands of an operator of the vehicle are on the handwheel based on the operator torque estimation signal.

2. The method of claim 1, wherein the handwheel is associated with an electric power steering system of the vehicle.

3. The method of claim 1, wherein the handwheel is associated with a hydraulic steering system of the vehicle.

4. The method of claim 3, wherein the hydraulic steering system includes a magnetic actuator incorporated into a valve assembly of the hydraulic steering system.

5. The method of claim 1, further comprising:

generating a delayed valve toque signal by delaying a received valve torque signal.

6. The method of claim 5, wherein generating the operator torque estimation signal is further based on the delayed received value torque signal.

7. The method of claim 1, wherein the sensor associated with the handwheel of the vehicle includes a handwheel position sensor.

8. A system for hands-on-wheel detection, the system comprising:

a processor; and a memory including instructions that, when executed by the processor, cause the processor to:

receive, via a serial communication bus, a handwheel angle signal from a sensor associated with a handwheel of a vehicle;

set, via the serial communication bus, an update handwheel angle signal indicator to true;

generate, based on a handwheel angle indicated by the handwheel angle signal and based on determining using the serial communication bus that the update handwheel angle signal indicator is set to true, a handwheel speed signal and a handwheel acceleration signal;

synchronize the handwheel speed signal and the handwheel acceleration signal by generating a delayed handwheel speed signal and a delayed handwheel acceleration signal;

generate a friction value by passing a product of a friction direction signal and a friction magnitude scale value through a low pass filter;

calculate a damping value by determining a product of a handwheel speed value, indicated by the delayed handwheel speed signal, and a damping coefficient scale value;

calculate an inertia value by determining a product of a handwheel acceleration value, indicated by the delayed handwheel acceleration signal, and a handwheel inertia scale value;

generate an operator torque estimation signal based on, at least, the delayed handwheel speed signal, the delayed handwheel acceleration signal, the friction value, the damping value, and the inertia value; and determine whether hands of an operator of the vehicle are on the handwheel based on the operator torque estimation signal.

9. The system of claim 8, wherein the handwheel is associated with an electric power steering system of the vehicle.

10. The system of claim 8, wherein the handwheel is associated with a hydraulic steering system of the vehicle.

11. The system of claim 10, wherein the hydraulic steering system includes a magnetic actuator incorporated into a valve assembly of the hydraulic steering system.

12. The system of claim 8, wherein the instructions further cause the processor to:

generate a delayed valve toque signal by delaying a received valve torque signal.

13. The system of claim 12, wherein the instructions further cause the processor to generate the operator torque estimation signal further based on the delayed received value torque signal.

14. The system of claim 8, wherein the sensor associated with the handwheel of the vehicle includes a handwheel position sensor.

15. An apparatus for hands-on-wheel detection, the apparatus comprising:

a processor; and a memory including instructions that, when executed by the processor, cause the processor to:

receive, via a serial communication bus, a handwheel angle signal from a sensor associated with a handwheel of a vehicle;

set, via the serial communication bus, an update handwheel angle signal indicator to true;

generate, based on a handwheel angle indicated by the handwheel angle signal and based on determining using the serial communication bus that the update handwheel angle signal indicator is set to true, a handwheel speed signal and a handwheel acceleration signal;

synchronize the handwheel speed signal and the handwheel acceleration signal by generating a delayed handwheel speed signal and a delayed handwheel acceleration signal;

calculate a damping value by determining a product of a handwheel speed value, indicated by the delayed handwheel speed signal, and a damping coefficient scale value;

calculate an inertia value by determining a product of a handwheel acceleration value, indicated by the delayed handwheel acceleration signal, and a handwheel inertia scale value;

calculate a friction value by passing a product of a friction direction signal and a friction magnitude scale value through a low pass filter;

generate a delayed valve toque signal by delaying a received valve torque signal;

generate an operator torque estimation signal based on the damping value, the inertia value, the friction value, and the delayed received value torque signal; and determine whether hands of an operator of the vehicle are on the handwheel based on the operator torque estimation signal.

16. The apparatus of claim 15, wherein the handwheel is associated with an electric power steering system of the vehicle.

17. The apparatus of claim 15, wherein the handwheel is associated with a hydraulic steering system of the vehicle.

18. The apparatus of claim 17, wherein the hydraulic steering system includes a magnetic actuator incorporated into a valve assembly of the hydraulic steering system.

\* \* \* \* \*